Jan. 29, 1957 W. H. HOGAN 2,779,556
HYDRAULIC STEERING MECHANISM FOR AIRCRAFT LANDING GEAR
Filed Jan. 13, 1955 4 Sheets-Sheet 1

INVENTOR.
WALTER H. HOGAN
BY
ATTORNEY

INVENTOR.
WALTER H. HOGAN
BY
ATTORNEY

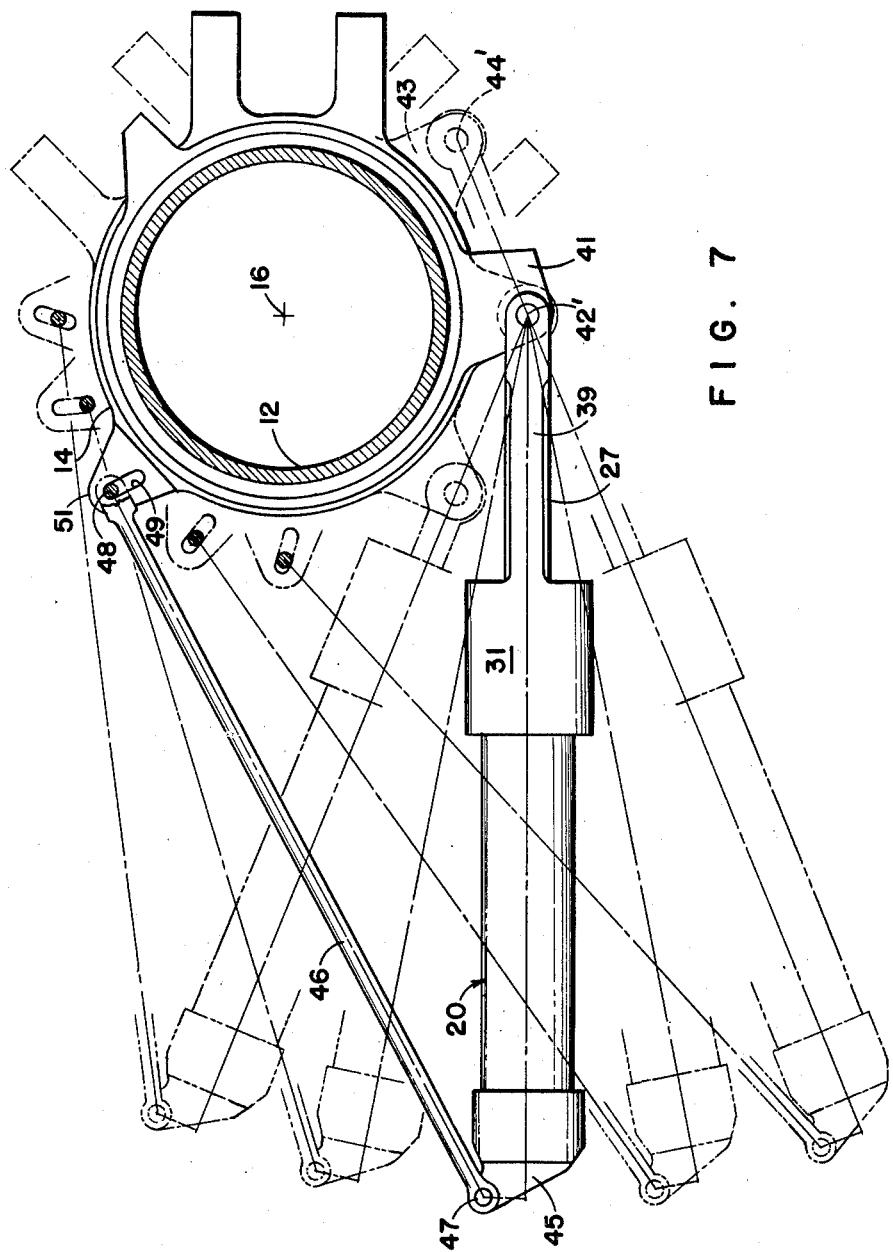

INVENTOR.
WALTER H. HOGAN
BY
*John E. Runfer*
ATTORNEY

United States Patent Office 2,779,556
Patented Jan. 29, 1957

2,779,556

HYDRAULIC STEERING MECHANISM FOR AIRCRAFT LANDING GEAR

Walter H. Hogan, Olmsted Falls, Ohio, assignor to The Cleveland Pneumatic Tool Company, Cleveland, Ohio, a corporation of Ohio Application January 13, 1955, Serial No. 481,609

9 Claims. (Cl. 244—50)

This invention relates generally to aircraft structures and more particularly to a new and improved steering mechanism suitable for use in the ground steering of an aircraft.

It is an important object of this invention to provide a new and improved light weight steering structure particularly adapted for installation on a strut assembly of an aircraft landing gear.

It is another object of this invention to provide a steering mechanism capable of steering through relatively large angles wherein the torque efficiency is relatively high throughout the entire range of steering.

It is still another object of this invention to provide a steering mechanism having the characteristics of positive control in both steering and shimmy damping wherein the structural loads on the elements lie within the planes of maximum strength so that the weight may be reduced to the minimum.

It is still another object of this invention to provide a steering mechanism particularly adapted for aircraft which utilizes a simple, easily manufactured structure.

Further objects and advantages will appear from the following description and drawings, wherein:

Figure 7 is a diagrammatic view showing of the operation of the steering mechanism in various positions of turning.

Figure 1:
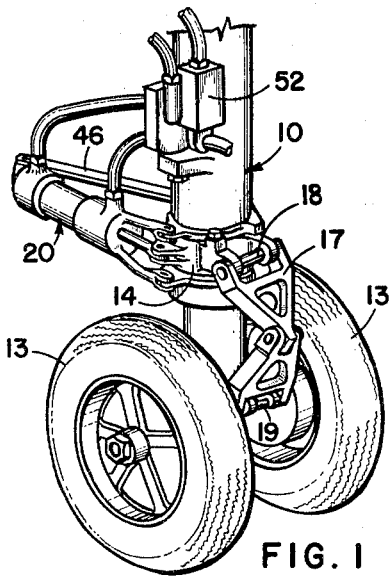
Figure 1 is a fragmentary perspective view of a nose gear for an aircraft incorporating a steering mechanism according to this invention.

Referring to the drawings, the steering mechanism is shown as it would be applied to a conventional nose strut 10 of a landing gear. The strut itself includes inner and outer upright telescoping sections 11 and 12 respectively, wherein the inner telescoping section is axially movable and rotatable relative to the outer telescoping section which is fixed to the aircraft itself. Wheels 13 are mounted on the lower end of the inner telescoping section and a steering collar 14 is journaled on the outer telescoping section 12 for rotation about the central axis 16 of the strut. Torque arms 17 are pivoted at their upper end to the steering collar as at 18 at one end, and near the lower end of the inner telescoping section 11 as at 19 at their other end, in such a manner that the steering collar 14 and the inner telescoping section 11 are angularly fixed even though the inner telescoping section is free to move axially relative to the steering collar.

A hydraulic steering cylinder assembly 20 includes a cylinder 21 and a piston 22 movable axially within the cylinder in response to fluid under pressure. The cylinder 21 is closed at its outer end and provided with a seal assembly 24 at the inner end formed with a central aperture 26 through which a piston rod 27 projects. An end member 31 is threaded on the cylinder 21 and firmly retains the seal assembly 24 in place. A first resilient seal 28 prevents fluid leakage between the piston rod 27 and the seal assembly 24 and second resilient seals 29 prevent leakage between the seal assembly 24, the end member 31 and the cylinder 21. The end of the piston rod 27 is threaded into the piston 22 and a nut 33 securely locks it in position. Suitable seals 34 are provided to prevent fluid leakage between the cylinder 21, the piston 22 and the piston rod 27. Fluid conducting ports 37 and 38 are provided so that fluid under pressure may be introduced into either end of the cylinder. Those skilled in the art will recognize that by utilizing this structure, a simple double-acting cylinder assembly 20 is provided which can produce forces for moving piston rod 27 axially relative to the cylinder 21 in either direction.

The end member 31 is provided with two axially extending mounting arms 39 formed with longitudinal notches 40 in the ends thereof. The notches 40 are arranged to receive lugs 41 formed on the outer telescoping section 12 on either side of the steering collar 14. Pivot pins 42 extend through ends of the arms 39 and the lugs 41 and provide a connection between the outer telescoping section 12 and the cylinder assembly 20 whereby the cylinder assembly is free to turn around the pivot axis 42' of the pins which axis is parallel to the central axis 16. The two arms 39 should be located symmetrically on either side of the cylinder axis so that substantially no bending moments will be present in the vertical plane through the cylinder axis when the mechanism is operated. The end of the piston rod 27 extends between a pair of lugs 43 formed on the steering collar 14 and a pivot pin 44 extends through the end of the piston rod 27 and both of the lugs 43, thereby providing a connection between the steering collar 14 and piston rod whereby the rod is free to rotate relative to the steering collar around the pivot axis 44' of the pins 44.

Figure 6:
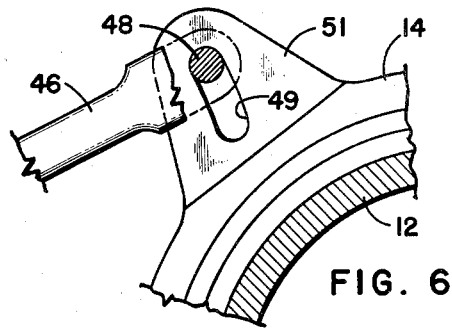
Figure 6 is a fragmentary view partially in section of the connection between the stabilizing bar and the steering collar.
Figure 2:
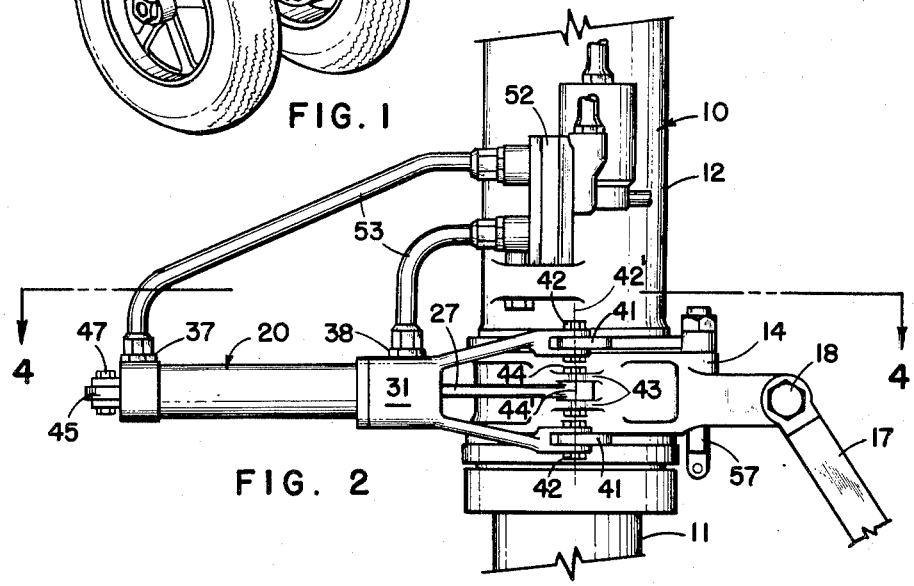
Figure 2 is a side elevation of the assembled steering mechanism.
Figure 3:
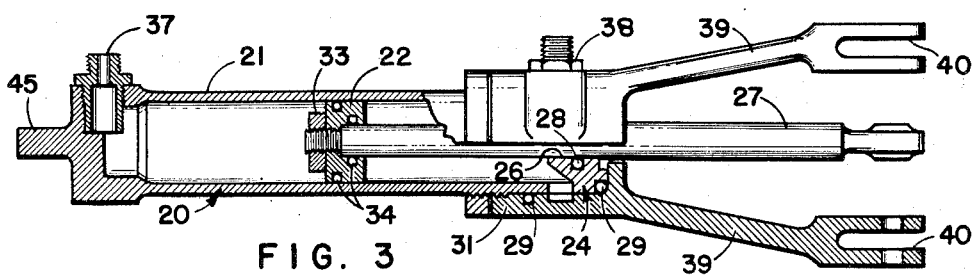
Figure 3 is a side elevation partially in longitudinal section showing the piston and cylinder structure of the steering mechanism.

A stabilizing bar 46 is pivoted at one end on an end flange 45 of the cylinder assembly 20 as at 47 and provided with a pin 48 at the other end which extends through a slot 49 formed in a boss 51 on the steering collar 14 see Figure 6). The ports 37 and 38 are connected to a source of fluid under pressure (not shown) through a control valve 52 mounted on the outer telescoping section 12 and flexible hydraulic lines 53. The valve structure should be arranged so that when the wheels 13 are to be turned to the left, fluid under pressure is admitted to the port 37 and the port 38 is connected to the reservoir return. This produces a force on the piston rod to the right as shown in Figure 2 which causes the steering collar to rotate and thereby turn the wheels. A stop pin 57 is mounted on the steering collar 14 and is adapted to engage a stop surface 58 formed on the outer telescoping section 12 to limit the angle of turning to the left. Similarly, a stop surface 60 on the lugs 41 is engaged by the stop pin 57 at the extreme position of turning to the right. When turning the wheels to the right, the valve 52 is operated to reverse the fluid circuit and fluid pressure is admitted to the cylinder through the port 38. Also the valve should provide a third or neutral position which introduces flow restrictions in the fluid circuit for vibration damping. For a detailed description of a valve structure which would be suitable for this use, reference should be made to my copending application, Serial No. 489,987, filing date February 23, 1955.

Figure 4:
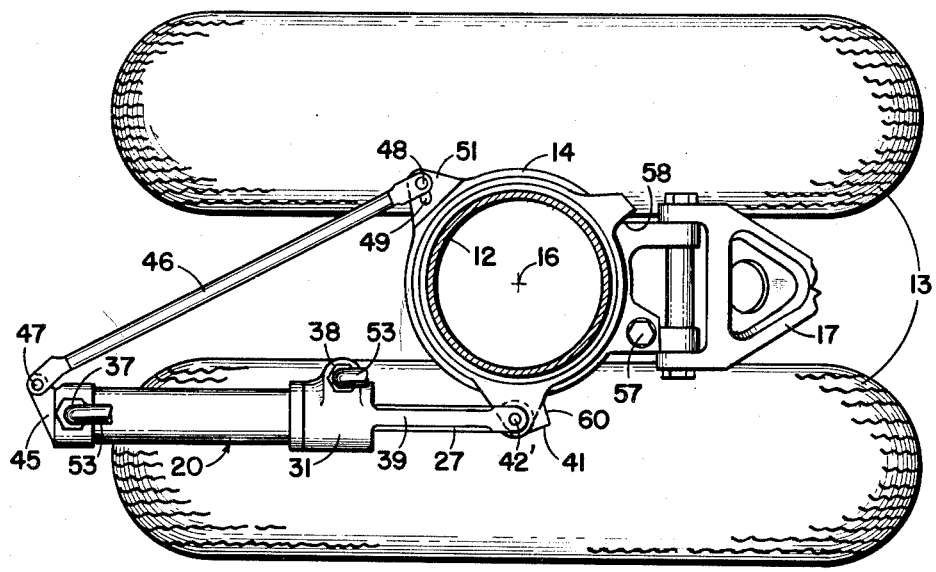
Figure 4 is a plan view taken along 4—4 of Figure 2 with the wheels added showing the position the elements assume when the steering is in the neutral position.

In Figure 4 the steering is shown in the neutral position which it assumes when the wheels are aligned with the axis of the aircraft, at which time the pivots 42' and 44' are coaxial and the axis of the cylinder assembly 20 is perpendicular to a plane through the axes 42' and 16. At this time the slot 49 is perpendicular to a line through the pivot 47 and the pin 48 so that the slot restricts any motion of the stabilizing bar 46 along its length. The slot 49 is preferably formed so that its walls define an arc having a center of curvature at the pivot 47 when the various elements are in the position shown in Figure 4. At this time a rigid structure is formed by the cylinder assembly 20 and the stabilizing bar so that the cylinder assembly is securely held in its proper position. This is true regardless of the position of the pin 48 in the slot 49 since the walls of the slot are arcs having a center of curvature at the pivot 47. It is necessary to utilize the stabilizing bar when the steering is in the neutral position since the pivots 42' and 44' are aligned and are therefore incapable of stabilizing the cylinder against rotation about the pivots.

Figure 5:
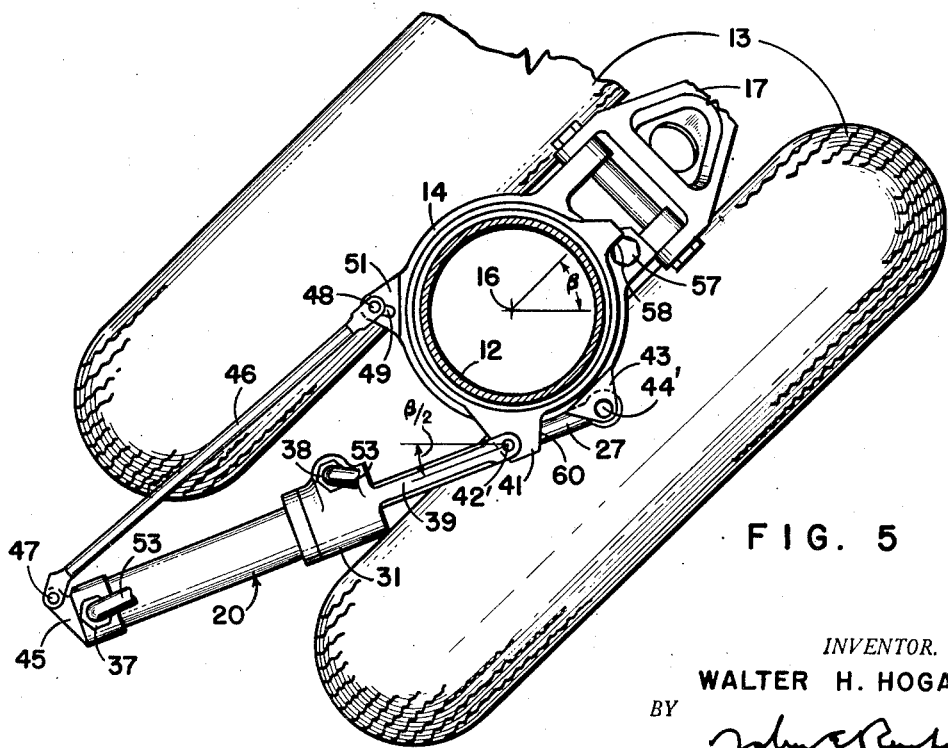
Figure 5 is a plan view similar to Figure 4 showing the mechanism in an extreme position of turning.

When the mechanism is operated to turn the wheels away from the central position, fluid under pressure is admitted through one of the ports 37 or 38 which produces a force on the piston rod 27 and in turn moves the pivot 44' away from the pivot 42' as shown in Figure 5 and turns the wheels. Since both of the pivots 42' and 44' are equally spaced from the axis of rotation 16, the angular velocity of rotation of the cylinder assembly 20 about the pivot 42' will be one-half the angular velocity of rotation of the steering collar 14. Therefore, when the steering collar turns through the angle B, the cylinder assembly turns through the angle B/2. Because the two pivots 42' and 44' will stabilize the cylinder assembly in all positions other than the neutral position, this neutral position is the only one in which the bar 46 is necessary. The slot 49 is used to insure that no forces are transmitted through the stabilizing bar when the mechanism is in positions other than the neutral position which forces would produce a bending moment on the piston rod. Reference to Figures 5 and 7 will show that when the mechanism is in a position other than the neutral position, the walls of the slot 49 will not be perpendicular to the line of action of the stabilizing bar and any tendency of the bar to transmit forces will merely cause the pin 48 to move along the slot 49 to a position wherein such forces are relieved. Figure 7 shows the position the pin 48 takes in the slot 49 as the steering moves through its complete steering range and clearly illustrates that the pin will move back and forth within the slot.

The structure of the stabilizing bar 46, the cylinder assembly 20, the outer telescoping section 12 and the steering collar 14 cooperate to form a 4-bar linkage wherein the telescoping section is the fixed bar and the steering collar rotates about the axis 16. By properly choosing the various proportions a linkage results which will approximate an angular velocity ratio of two through the range of steering so a short slot 49 may be used. Figure 7, wherein the relative position of the elements is shown as the mechanism operates through its entire range, illustrates that when the proportions are properly chosen, the slot 49 may be made relatively short and can still serve to compensate for the linkage variations from the velocity ratio of two determined by the pivotal mounting of the cylinder assembly 20 and the piston rod 27.

By utilizing the structure wherein the cylinder is pivoted for rotation about an axis spaced from the central axis of the strut a distance equal to the spacing of the pivot axis of the piston from the central axis of the strut, a mechanism results which will efficiently produce torque through large turning angles. This is due to the fact that the cylinder turns with the steering collar through an angle equal to one-half the turning angle of the steering collar and thus tends to track the collar in its movement. Therefore, the effective radius of the force produced by the piston on the collar remains relatively constant when compared with more conventional structures, with the result that a smaller piston may be utilized to produce a given amount of torque throughout the entire turning arc. Also by pivoting the cylinder and piston an equal distance from the central axis of the strut, a structure results wherein the cylinder is pivoted on the axis of the piston rod and no bending moments will be present in the piston rod. It should be noted that the structure of the steering mechanism is arranged so that there are never any bending moments in any of the elements of the cylinder assembly 20 or the stabilizing bar and all the forces carried by these elements are aligned with their axis. For this reason the structural elements may be made light to reduce the weight of the assembled unit without any sacrifice of the strength or safety.

Figure 8:
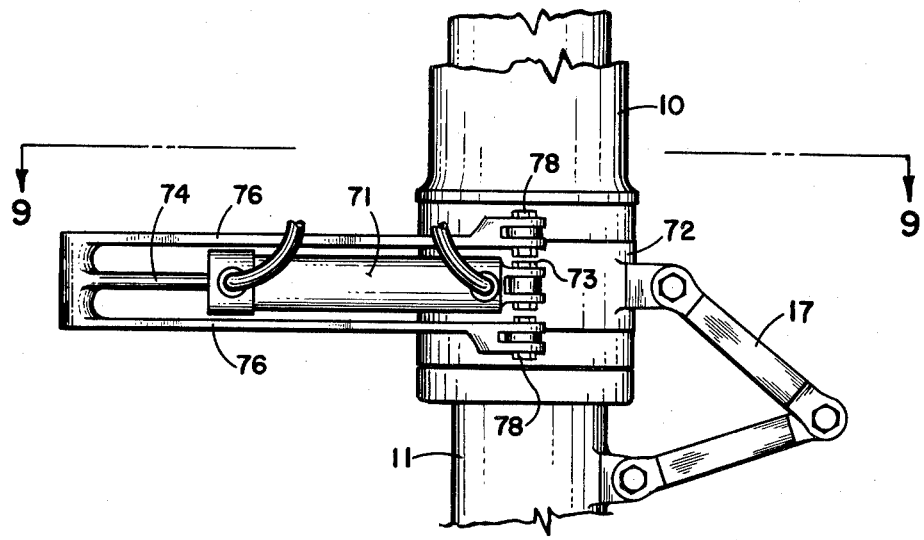
Figure 8 is a side elevation of a second embodiment wherein the cylinder is pivotally connected to the steering collar and the piston is pivotally connected to the upper telescoping member; and, Figure 9 is a plan view taken along 9—9 of Figure 8.
Figure 9:
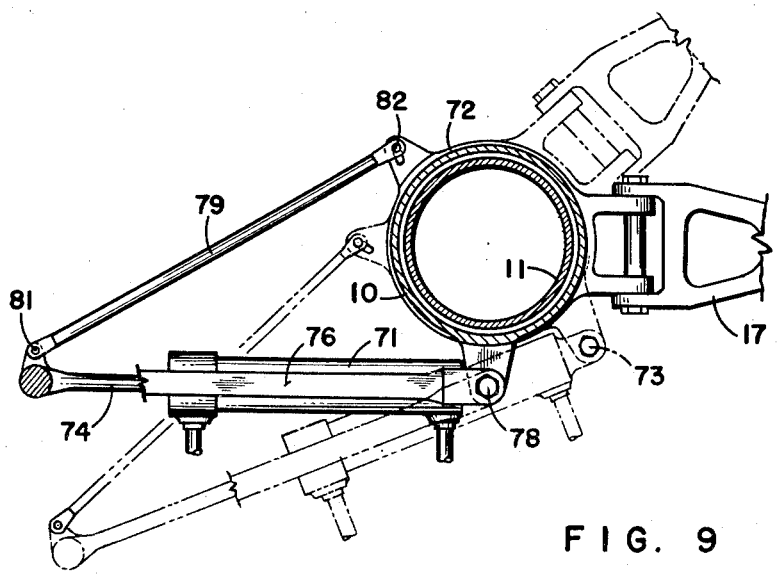

In Figures 8 and 9 a second embodiment of this invention is shown wherein the cylinder 71 is pivotally connected to a steering collar 72 by a pivot pin 73 and a cooperating piston 74 is formed with tie bar portions 76 which are in turn pivotally connected to the upper telescoping member 10 by pivotal pins 78. A stabilizing bar 79 is pivotally connected to the piston 74 as at 81 and connected to the steering collar 72 by the usual pin and slot connection at 82. In this embodiment the structure functions in the same way as in the previous embodiment of Figures 1 to 7 however, the piston and cylinder arrangement is reversed so that the cylinder is pivotally connected to the steering collar and the piston is pivotally connected to the upper telescoping member 10. When the steering mechanism rotates the steering collar through a given angle, the piston and cylinder rotate about the pivots through one-half of the angle of rotation of the steering collar as in the previous embodiment.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A steering mechanism comprising a fixed element, a rotatable element mounted on said fixed element for rotation about a first axis, fluid actuated cooperating cylinder and piston members axially movable relative to one another, a cylinder mounting portion extending beyond one end of said cylinder member, a piston mounting portion extending from said piston member beyond said one end of said cylinder, one of said portions being pivotally connected to said fixed element and the other to said rotatable element for pivotal movement about two axes equally spaced from and parallel to said first axis wherein said pivotal connections are both beyond said one end of said cylinder member.

2. A steering mechanism comprising a fixed element, a rotatable element mounted on said fixed element for rotation about a first axis, fluid actuated cooperating cylinder and piston members axially movable relative to one another, a cylinder mounting portion extending beyond one end of said cylinder member, a piston mounting portion extending from said piston member beyond said one end of said cylinder, one of said portions being pivotally connected to said fixed element and the other to said rotatable element for pivotal movement about two axes equally spaced from and parallel to said first axis wherein said pivotal connections are both beyond said one end of said cylinder member, and means supporting at least one of said members against uncontrolled rotation around its pivot.

3. A steering mechanism comprising a fixed element, a rotatable element mounted on said fixed element for rotation about a fixed axis in either direction from a first position, fluid actuated cooperating cylinder and piston members capable of relative axial movement, a cylinder mounting portion extending beyond one end of said cylinder member, a piston mounting portion extending from said piston member beyond one end of said cylinder, one of said portions being pivotally connected to said fixed element and the other to said rotatable element for imparting rotation thereto upon said relative axial movement, the pivotal axes of said portions being parallel to said first axis and coaxial when said rotatable element is in said first position.

4. A steering mechanism comprising a fixed element, a rotatable element mounted on said fixed element for rotation about a first axis in either direction from a first position, fluid actuated cooperating cylinder and piston members capable of relative axial movement, a cylinder mounting portion extending beyond one end of said cylinder member, a piston mounting portion extending from said piston member beyond said one end of said cylinder, one of said portions being pivotally connected to said fixed element and the other to said rotatable element for pivotal movement about second and third axes parallel to said first axis and coaxial when said rotatable element is in said first position, and means for stabilizing said members when said second and third axes are coaxial.

5. In a steering mechanism of the character described, a fixed element, a rotatable element mounted on said fixed element for rotation about a first axis, a fluid cylinder, a piston in said cylinder axially movable relative thereto in response to fluid under pressure therein, valve means for controlling fluid flow to and from said cylinder, a piston rod connected to said piston extending along the axis of said cylinder beyond one end thereof, a rigid member on said cylinder extending from said one end in generally the same direction as said piston rod, said member being pivoted to said fixed element for rotation about a second axis parallel to and spaced from said first axis, and said piston rod being pivoted on said rotatable element for rotation about a third axis parallel to and spaced from said first axis whereby relative axial motion between said cylinder and piston rod produces relative rotation between said elements, and means between said rotatable element and cylinder preventing uncontrolled rotation of said cylinder about said second axis.

6. In a steering device of the character described, first and second relatively rotatable concentric tubular members, a steering member rotatable on said first member about the central axis thereof, torque means between said steering member and said second tubular member preventing relative rotation therebetween, fluid actuated cooperating cylinder and piston elements adapted to produce forces therebetween along the axes thereof, one of said elements being pivoted on said first member and the other of said elements being pivoted on said steering member, both of said element pivots being on the axis of said cylinder and piston elements equally spaced from said central axis and beyond one end of said cylinder element, and stabilizing means between said one element and said steering member preventing rotation of said one element around its pivot in at least one position of said steering member.

7. In a steering device of the character described, first and second relatively rotatable concentric tubular members, a steering member rotatable on said first member in either direction about the central axis thereof from a first position, torque means between said steering member and said second tubular member preventing relative rotation therebetween, fluid actuated cooperating cylinder and piston elements adapted to produce forces therebetween along the axes thereof, one of said elements being pivoted on said first member and the other of said elements being pivoted on said steering member, both of said element pivots being on the axis of said cylinder and piston elements equally spaced from said central axis and beyond one end of said cylinder element, a stabilizing bar pivotally connected on said one element and to said steering member, one of said stabilizing bar pivotal connections being rigid along the line of action of said stabilizing bar only when said steering member is in said first position.

8. In a steering device of the character described, first and second relatively rotatable concentric tubular members, a steering member rotatable on said first member in either direction about the central axis thereof from a first position, torque means between said steering member and said second tubular member preventing relative rotation therebetween, fluid actuated cooperating cylinder and piston elements adapted to produce forces therebetween along the axes thereof, one of said elements being pivoted on said first member and the other of said elements being pivoted on said steering member, both of said element pivots being on the axis of said cylinder and piston elements equally spaced from said central axis and beyond one end of said cylinder element, a stabilizing bar pivoted on said one element and connected to said steering member, and means within the connection between said steering member and stabilizing bar preventing forces from being transmitted from said steering member to said bar when said steering member is spaced from said first position.

9. In a steering mechanism of the character described, first and second relatively rotatable concentric tubular members, a steering collar mounted on said first member for rotation about the central axis thereof in either direction away from a first position, a fluid cylinder element and a cooperating piston element adapted to produce forces therebetween along the axis thereof in response to fluid under pressure, one of said elements being pivoted on said first member and the other of said elements being pivoted on said steering collar, both of said element pivots being on the axis of said cylinder and piston perpendicular relative thereto and parallel to and spaced from said central axis, both of said element pivots being at the same end of said cylinder, a stabilizing bar having one end pivotally connected to said one element and the other end to said steering collar, the pivotal connection of one end of said bar comprising a pin within a slot having walls perpendicular to the line of action of said bar when said steering collar is in said first position.

References Cited in the file of this patent

UNITED STATES PATENTS

| | | |
|---|---|---|
| 2,621,002 | Pittman | Dec. 9, 1952 |
| 2,650,782 | Fehring | Sept. 1, 1953 |

FOREIGN PATENTS

| | | |
|---|---|---|
| 533,112 | Great Britain | Feb. 6, 1941 |